O. E. HILL.
SIGNALING GENERATOR.
APPLICATION FILED DEC. 4, 1916.

1,396,750.

Patented Nov. 15, 1921.

Inventor:
Owen E. Hill.
by J.S. Roberts
Att'y.

UNITED STATES PATENT OFFICE.

OWEN E. HILL, OF NEW YORK, N. Y., ASSIGNOR TO WESTERN ELECTRIC COMPANY, INCORPORATED, OF NEW YORK, N. Y., A CORPORATION OF NEW YORK.

SIGNALING-GENERATOR.

1,396,750.  Specification of Letters Patent.  Patented Nov. 15, 1921.

Application filed December 4, 1916. Serial No. 134,914.

*To all whom it may concern:*

Be it known that I, OWEN E. HILL, a citizen of the United States, residing at New York, in the county of New York and State of New York, have invented certain new and useful Improvements in Signaling Generators, of which the following is a full, clear, concise, and exact description.

This invention relates to electric signaling, and more especially to signaling means for use in telephone systems.

The object of the invention is to provide a signaling generator of convenient and compact size, and of low cost.

One feature of the invention is to produce alternating current for signaling purposes through utilization of a transformer wherein the current passing through one winding actuates means to interrupt the energizing current.

A second feature is to produce alternating current for signaling purposes by utilizing a signal-receiving device at the calling station to control the generation of alternating current by a generating device, and actuate the signals at other stations.

Another feature is to utilize a signal-receiving device associated with one winding of a transformer or inductorium to interrupt the circuit flowing through another winding, to generate alternating current in the first winding.

A further feature is the utilization of a single structure to perform the functions of a signaling transformer and a transmission induction coil.

An additional feature is the provision of means to disassociate the telephonic devices from the line simultaneously with the connection of the signaling devices therewith, and vice versa.

Figure 1:
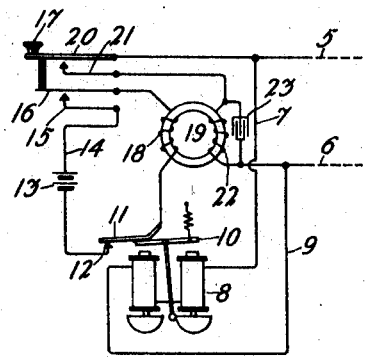
Figure 2:
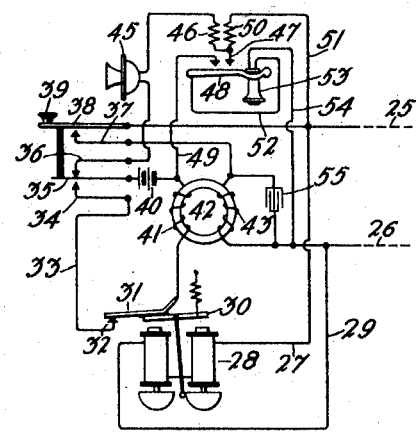
Figure 3:
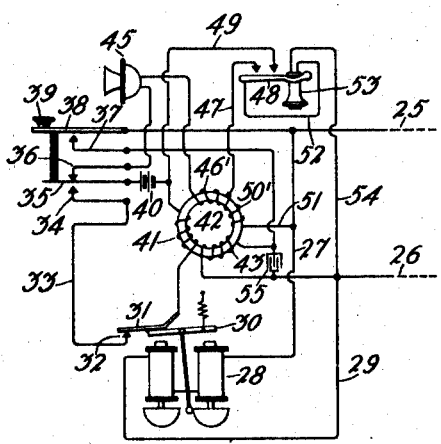
Figure 4:
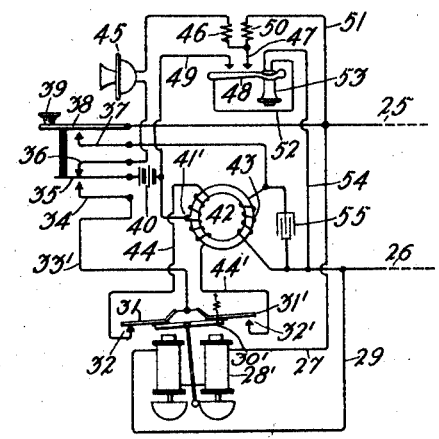

Referring to the drawings, Figure 1 shows a circuit arrangement of the invention applied to a ringer signaling station; Fig. 2 shows a circuit arrangement of a telephone substation embodying my invention; Fig. 3 shows a modified substation circuit wherein the transformer and transmission induction coil are wound on the same core, while Fig. 4 shows a modified substation circuit wherein the primary winding of the transformer is split and the parts alternately energized through contacts controlled by the ringer.

It has heretofore been general in local battery telephone systems to use magneto generators to furnish alternating current to operate signals at desired points. Such generators form a considerable item in the cost of substation equipment, requiring relatively large boxes to contain them, and such magneto generators furthermore necessitate manual operation thereof by the calling party. By using a transformer which can be made much smaller than a magneto generator, and interrupting the circuit thereto through the usual ringer, it is possible to provide a much more compact equipment at less cost and one wherein the only manual operation necessary is the depression of a key to close the primary circuit of the transformer.

In Fig. 1, which shows an arrangement purely for signaling purposes, the line wires 5 and 6 lead either to a central station or to other stations which it is desired to call. A conductor 7 leads from line 5 to the coils of a ringer 8, from which another conductor 9 extends to the line 6. This enables the station shown to be called by pulsating or alternating current sent from other stations over the lines 5 and 6. The armature 10 of the ringer 8 carries a contact piece 11, and is arranged to normally engage a contact 12 connected to a battery 13. To effect this engagement, any desired arrangement may be used, for example, a spring. A conductor 14 leads from the other side of the battery to a contact 15, with which a contact 16 of a key 17 is arranged to engage on operation of the key. The contact 16 is connected to one side of the primary winding 18 of a transformer or inductorium 19, the other side of the primary being connected to the contact piece 11. The key has two other contacts 20 and 21 normally separated. The contact 20 is connected to the line 5, while contact 21 is connected to the secondary 22 of the transformer 19, which, in turn, is connected to the other line 6. A condenser 23 of proper capacity may be bridged about the secondary 22 to prevent currents of excessive voltage being sent over the lines 5 and 6 with consequent detrimental effect to their insulation. While this is desirable, it is in no sense essential to the operation of the invention.

When it is desired to signal from the station shown, the key 17 is depressed to bring the contacts 15 and 16 together to close the primary circuit, and contacts 20 and 21 together to close the secondary circuit. The primary circuit extends from battery, conductor 14, contacts 15 and 16, primary 18, contact piece 11, and contact 12 back to battery. The current passing through the primary induces a current in the secondary 22, which operates the signal at another station over a circuit extending from the secondary 22, contacts 21 and 20, line 5, to the other station similarly wired, thence over conductor 7, ringer 8, and conductor 9 of the other station, to line 6, and over this line to the secondary 22. The ringer 8 of the calling line is bridged between the lines 5 and 6, and will be energized in unison with the signal at the other station. On the first energization of the ringer 8 at the calling station, its armature 10 is attracted and opens the primary circuit between the contact piece 11 and contact 12. The current diminishes in the primary and, in so doing, induces a current in the secondary in a reverse direction to the first current induced, and produces an opposite movement of the armature 10 of the ringer 8 at the called station. Immediately on opening the battery circuit, and coincident with the second induced current, the armature 10 at the calling station would move to its normal position, again closing the circuit to the primary, and inducing a current in the secondary in an opposite direction to that last produced. The armatures 10 are again moved, opening the primary circuit and inducing a reverse current, as before described. This keeps up and actuates the ringers 8 so long as the key is held closed. A call from another station would send out pulsating current from the other station on the lines 5 and 6, over the conductors 7 and 9, and through the ringer 8 to operate the same. The transformer circuits of the called station being open at the key 17, no effect is produced thereon.

Figs. 2, 3 and 4 show alternative arrangements of telephone substation sets, embodying the invention. In Figs. 2 and 3, lines 25 and 26 have conductors 27 and 29 extending to a ringer 28. The ringer armature 30 has a contact piece 31 normally engaging a contact 32. A conductor 33 leads to a contact 34, arranged for engagement by a contact 35. The contacts 34 and 35, together with contacts 36, 37 and 38 are operated by a key 39. Contact 35 is connected to a battery 40, which is connected to the primary 41 of a transformer 42; the other side of the primary being connected to the contact piece 31. The contact 37 is connected to one side of the secondary 43 of the transformer 42, the other side of the secondary being connected to the line 26. As the contact 38 is connected to line 25, on closure of the key 39 engaging contact 35 with 34 and 38 with 37, the primary circuit is initially closed and the secondary bridged between the lines 25 and 26 to send out the currents induced by the primary 41 to operate the signal at the called station. The ringer 28 would act as an interrupter for the primary as in the form shown in Fig. 1. A condenser 55, bridged about the secondary 43, can be added for the same purpose as the condenser 23 of Fig. 1, if desired. To this extent the forms shown in Figs. 2 and 3 are identical. The form shown in Fig. 4 differs therefrom in carrying an additional contact piece 31' on the armature 30', and providing a contact 32' to be engaged thereby when the contacts 31 and 32 are opened. A conductor 33', connected to the contact pieces 31 and 31', leads to the contact 34. Instead of a plain primary winding for the transformer 42, as in the other forms, the primary 41' has a split winding, the battery 40 being connected to the intermediate point thereof, and conductors 44 and 44' leading from the other end of their respective parts of the primary 41' to the contacts 32 and 32'. Operation of the ringer 28', when the key is closed, will thus send current through one part of the primary 41', and then through the other part in a reverse direction, while the diminution of current in the part last opened will augment the current in the part of the primary just closed, to produce a greater effect on the secondary 43 than would be obtained by a single part of the primary 41' alone. Signaling to and calling from substations arranged as shown in Figs. 2, 3 and 4, would be the same as described for the form shown in Fig. 1.

To effect telephonic communication, the forms shown in Figs. 2, 3 and 4, have the contact 36 normally engaging the contact 35, which is connected to battery 40. The contact 36 is connected by a conductor to a telephone transmitter 45, and primary 46 of a transmission induction coil. This coil may be either a separate coil, is in Figs. 2 and 4, or may form a unitary structure with the transformer 42, as in Fig. 3, being wound on the same core for example. The primary of the coil in Fig. 3 is indicated as 46', while the secondary of the coil is indicated as 50'. A conductor 47 leads from the primary 46 or 46' to a normally open contact of a hook switch 48, which, when up, connects conductor 47 to a conductor 49 leading to battery 40, and thus completes the primary telephonic circuit. Fluctuations in the transmitter circuit in speaking would induce similar currents in the secondary 50 or 50' of the transmission coil, and complete the receiver circuit as follows: secondary 50 or 50', conductors 51, 25 to the called station, over conductor 51, secondary 50 or 50', conductor 37, switchhook 48, conductor 52, receiver 53, and conductor 54 of the called station to line 26, thence to the calling station, and through conductor 54, receiver 53, conductor 52, receiver hook 48, and conductor 47 to secondary 50 or 50'. While a shunt path exists through the ringers 28 or 28' of the stations conversing, the ringers are wound to such a high impedance that the volume of outgoing transmission is not appreciably affected. In general, all the substations would be connected to a central office, and signal the operator there, who would complete the connection to the desired party in the usual way. The invention is equally well-suited to other arrangements, and is not restricted to the particular arrangements herein described.

What is claimed is:

1. In a signaling system, in combination, a line, means to impress signaling current from other stations upon said line and a station set associated with said line comprising a transformer having a plurality of windings inductively associated, a line circuit including one of said windings, a second circuit including another of said windings, a signal associated with said line circuit responsive to signaling currents from other stations irrespective of the condition of said second circuit and also independently responsive to signaling current derived from said transformer, a source of electric current in said second circuit, means to close said second circuit, the closing of said second circuit inducing signaling current in said first circuit to operate said signal, and means controlled by operation of said signal to interrupt said second circuit.

2. A telephone set including a line circuit, a transmitter, a receiver, a transformer having a plurality of windings, means including certain of said windings inductively connected to telephonically associate said transmitter and receiver with said line circuit, another of said windings being for inclusion in said line circuit, means to include said last named winding in said line circuit, a signal associated with said line circuit and actuated through said last named winding, a second circuit including still another of said windings to induce current in the signal actuating winding, a source of electric current for said second circuit, means to close said second circuit, means to exclude the windings to effect telephonic association of the transmitter and receiver from the line circuit on actuation of the windings to effect signaling operation, and a call signal responsive to signaling current impressed upon said line circuit and independently operated by the current induced in said signal actuating winding to interrupt said second circuit.

3. In a telephone set, a line circuit, and a combined signaling generator and telephonic transmission means comprising a transformer having a plurality of windings, certain of said windings being inductively associated with said line circuit for telephone transmission, certain of said windings being inductively associated for the generation of signaling currents, a source of current to operate said transformer, and a call signal responsive to signaling current impressed upon said line circuit and independently controlled by the currents induced in one of said signaling windings to interrupt the current in another of said signaling windings.

In witness whereof I hereunto subscribe my name this 29th day of November A. D., 1916.

OWEN E. HILL.